United States Patent
Kim (10) Patent No.: US 11,326,892 B2
(45) Date of Patent: May 10, 2022

(54) ROUTE GUIDE APPARATUS AND METHOD FOR ELECTRIC VEHICLE

(71) Applicants: HYUNDAI MOTOR COMPANY, Seoul (KR); KIA MOTORS CORPORATON, Seoul (KR)

(72) Inventor: Choong Kim, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 267 days.

(21) Appl. No.: 16/273,384

(22) Filed: Feb. 12, 2019

(65) Prior Publication Data

US 2020/0116516 A1  Apr. 16, 2020

(30) Foreign Application Priority Data

Oct. 10, 2018  (KR) .................. 10-2018-0120631

(51) Int. Cl.
  *G01C 21/34* (2006.01)
  *B60L 58/24* (2019.01)
  *B60L 58/12* (2019.01)

(52) U.S. Cl.
  CPC .......... *G01C 21/3469* (2013.01); *B60L 58/12* (2019.02); *B60L 58/24* (2019.02)

(58) Field of Classification Search
  CPC ......... B60L 2240/545; B60L 2240/642; B60L 2240/662; B60L 2240/68; B60L 2260/52; B60L 2260/54; B60L 58/10; B60L 58/12; B60L 58/24; B60L 3/12; Y02T 10/70; Y02T 10/72; Y02T 90/16; G01C 21/3469

USPC .......................................... 701/410
  See application file for complete search history.

(56) References Cited

U.S. PATENT DOCUMENTS

| 9,701,302 | B2* | 7/2017 | Matsunaga | B60W 10/06 |
| 10,449,861 | B1* | 10/2019 | Wu | B60L 58/10 |
| 2008/0262668 | A1* | 10/2008 | Yamada | B60K 6/46 701/22 |
| 2008/0275644 | A1* | 11/2008 | Macneille | B60W 10/26 701/414 |
| 2009/0234521 | A1* | 9/2009 | Kumar | B60L 58/10 701/19 |
| 2010/0324765 | A1* | 12/2010 | Iida | H01M 10/443 701/22 |
| 2011/0066310 | A1* | 3/2011 | Sakai | B60L 7/16 701/22 |

(Continued)

FOREIGN PATENT DOCUMENTS

| AU | 2008264146 A1 * | 7/2009 | B60L 11/1818 |
| CN | 109733248 A * | 5/2019 | |

(Continued)

*Primary Examiner* — Atul Trivedi
(74) *Attorney, Agent, or Firm* — Morgan, Lewis & Bockius LLP (57) ABSTRACT

A route guide apparatus and a route guide method for an electric vehicle may include a sensor to measure an ambient temperature of the electric vehicle, a battery manager to monitor a battery temperature, and a processor to perform a route guide by predicting battery power based on at least one of the ambient temperature or the battery temperature, when searching for a traveling route to a destination, and by selecting, as a traveling route, a route which represents the least total cost of battery consumption energy based on the predicted battery power.

16 Claims, 5 Drawing Sheets

(56) References Cited

U.S. PATENT DOCUMENTS

| | | | |
|---|---|---|---|
| 2011/0257879 A1* | 10/2011 | Ishibashi | G01C 21/3676 701/533 |
| 2012/0248868 A1* | 10/2012 | Mobin | B60L 53/11 414/589 |
| 2012/0303397 A1* | 11/2012 | Prosser | B60L 53/18 705/7.12 |
| 2013/0024112 A1* | 1/2013 | Tate, Jr. | G01C 21/3476 701/439 |
| 2013/0079962 A1* | 3/2013 | Ishikawa | B60L 15/2045 701/22 |
| 2015/0239365 A1* | 8/2015 | Hyde | B60L 58/26 701/2 |
| 2015/0266390 A1* | 9/2015 | Shin | H02J 7/00 701/22 |
| 2015/0275787 A1* | 10/2015 | Dufford | B60W 10/08 701/112 |
| 2015/0275788 A1* | 10/2015 | Dufford | B60W 50/0097 701/1 |
| 2016/0332616 A1* | 11/2016 | Zhao | B60W 10/08 |
| 2017/0080919 A1* | 3/2017 | Follen | F02N 11/0837 |
| 2017/0136881 A1* | 5/2017 | Ricci | B60L 5/005 |
| 2017/0136891 A1* | 5/2017 | Ricci | B60L 5/18 |
| 2017/0136892 A1* | 5/2017 | Ricci | B60L 53/66 |
| 2017/0140349 A1* | 5/2017 | Ricci | B60L 53/36 |
| 2017/0141368 A1* | 5/2017 | Ricci | G01C 21/3697 |
| 2017/0176195 A1* | 6/2017 | Rajagopalan | G01C 21/3415 |
| 2017/0349161 A1* | 12/2017 | Peterson | B60W 10/06 |
| 2017/0370738 A1* | 12/2017 | Park | G01C 21/3667 |
| 2018/0222309 A1* | 8/2018 | Follen | B60W 10/08 |
| 2018/0257473 A1* | 9/2018 | Follen | B60L 53/68 |
| 2018/0272878 A1* | 9/2018 | Lee | B60H 1/00778 |
| 2018/0283887 A1* | 10/2018 | Dudar | G01C 21/3469 |
| 2019/0217724 A1* | 7/2019 | Erb | B60K 6/48 |
| 2019/0283584 A1* | 9/2019 | Koebler | B60W 10/11 |
| 2019/0283585 A1* | 9/2019 | Koebler | G08G 1/096775 |
| 2019/0283586 A1* | 9/2019 | Koebler | B60L 7/12 |
| 2019/0283587 A1* | 9/2019 | Koebler | G01C 21/3617 |
| 2019/0283588 A1* | 9/2019 | Koebler | B60T 7/22 |
| 2019/0283589 A1* | 9/2019 | Koebler | F16D 61/00 |
| 2019/0283590 A1* | 9/2019 | Koebler | G07C 5/085 |
| 2019/0283591 A1* | 9/2019 | Koebler | B60K 35/00 |
| 2019/0283592 A1* | 9/2019 | Koebler | B60L 15/2045 |
| 2019/0283593 A1* | 9/2019 | Koebler | B60L 58/12 |
| 2019/0283594 A1* | 9/2019 | Koebler | B60K 35/00 |
| 2019/0283595 A1* | 9/2019 | Koebler | G08G 1/096775 |
| 2019/0283596 A1* | 9/2019 | Koebler | B60L 3/12 |
| 2019/0283597 A1* | 9/2019 | Koebler | B60L 3/12 |
| 2019/0283598 A1* | 9/2019 | Koebler | F16D 61/00 |
| 2019/0283599 A1* | 9/2019 | Koebler | B60W 30/18127 |
| 2019/0283600 A1* | 9/2019 | Koebler | B60L 50/62 |
| 2019/0283601 A1* | 9/2019 | Koebler | B60W 10/184 |
| 2019/0283602 A1* | 9/2019 | Koebler | G06F 7/00 |
| 2019/0283603 A1* | 9/2019 | Koebler | B60K 35/00 |
| 2019/0283604 A1* | 9/2019 | Koebler | G08G 1/0145 |
| 2019/0283605 A1* | 9/2019 | Koebler | B60T 7/22 |
| 2019/0283606 A1* | 9/2019 | Koebler | B60W 50/0097 |
| 2019/0315232 A1* | 10/2019 | Ing | B60L 58/26 |
| 2020/0011687 A1* | 1/2020 | Lindemann | G07C 5/02 |
| 2020/0149996 A1* | 5/2020 | Seenumani | F02B 63/047 |
| 2020/0164763 A1* | 5/2020 | Holme | B60L 58/10 |
| 2020/0376979 A1* | 12/2020 | Liang | B60L 3/12 |
| 2021/0120564 A1* | 4/2021 | Lee | H04W 52/281 |
| 2021/0138927 A1* | 5/2021 | Maeng | G01C 21/3469 |
| 2021/0213952 A1* | 7/2021 | Willison | G08G 1/167 |
| 2022/0044504 A1* | 2/2022 | Consolacion | G07C 9/00309 |

FOREIGN PATENT DOCUMENTS

| | | | | |
|---|---|---|---|---|
| CN | 111834680 A | * | 10/2020 | B60H 1/143 |
| CN | 112020687 A | * | 12/2020 | B60L 15/2045 |
| CN | 113424067 A | * | 9/2021 | |
| DE | 102019200416 A1 | * | 7/2020 | |
| FR | 3010238 A1 | * | 3/2015 | B60L 50/10 |
| JP | 2009056940 A | * | 3/2009 | B60H 1/00278 |
| KR | 10-2018-0000591 A | | 1/2018 | |
| WO | WO-2017027332 A1 | * | 2/2017 | B60K 6/22 |
| WO | WO-2018104850 A1 | * | 6/2018 | |

\* cited by examiner

FIG. 6

ROUTE GUIDE APPARATUS AND METHOD FOR ELECTRIC VEHICLE

CROSS-REFERENCE TO RELATED APPLICATION

The present application claims priority to Korean Patent Application No. 10-2018-0120631, filed on Oct. 10, 2018, the entire contents of which is incorporated herein for all purposes by this reference.

BACKGROUND OF THE INVENTION

Field of the Invention

The present invention relates to a route guide apparatus and a route guide method for an electric vehicle, capable of searching for and providing a route representing the optimal energy consumption, based on the energy consumption of the electric vehicle to guide the electric vehicle.

Description of Related Art

In general, a navigation mounted in an electric vehicle additionally searches for and provides an ECO route to guide the electric vehicle, which is the optimal energy consumption path, in addition to the shortest route and the fastest route, when a destination is set. The ECO route refers to a route established based on energy consumption and representing the optimal energy consumption.

A driving battery mounted in the electric vehicle has a characteristic that battery power is lowered as a battery temperature is lowered in the same amount of charge remaining in a battery or as the amount of charge remaining in the battery is decreased at the same battery temperature. Accordingly, the electric vehicle may not drive up along a hill road since the power of the driving battery is lowered due to the discharge of the driving battery in the state that an amount of charge less remains in the driving battery in the winter.

However, in the conventional route guide apparatus for an electric vehicle, since the route to a destination is searched based on only an amount of charge remaining in the battery (State of Charge; SoC) and provided to guide the electric vehicle, a road section (link) which is difficult to drive as the battery power is lowered is not excluded from the route. Therefore, conventionally, there occurs the case that the electric vehicle is guided to the road section difficult to drive under a current battery power of the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a route guide apparatus and a route guide method for an electric vehicle, configured for searching for a route to a destination, which represents the optimal energy consumption, based on battery power made as the battery temperature of the electric vehicle is lowered, to guide the electric vehicle.

The technical problems to be solved by the present invention are not limited to the aforementioned problems, and any other technical problems not mentioned herein will be clearly understood from the following description by those skilled in the art to which the present invention pertains.

According to various aspects of the present invention, a route guide apparatus for an electric vehicle, may include a sensor to measure an ambient temperature of the electric vehicle, a battery manager to monitor a battery temperature, and a processor to perform a route guide by predicting battery power based on at least one of the ambient temperature or the battery temperature, when searching for a traveling route to a destination, and by selecting, as a traveling route, a route which represents the least total cost of battery consumption energy based on the predicted battery power.

The processor searches for at least one route to the destination based on map data and obtains road information related to each link included in the route which is found.

The processor predicts available battery power before traveling on each link, based on the battery temperature and a state of charge obtained through the battery manager.

The processor predicts battery power required in traveling on the link based on the road information related to the link.

The road information related to the link may include at least one of an average vehicle speed, a traveling time, a traveling distance, or a gradient of the link.

The processor determines a battery power cost of the link based on the required battery power and the available battery power.

The processor determines whether traveling is possible on the link, based on the battery power cost of the link.

The processor determines a total cost of the battery consumption energy, based on the battery power cost of the link.

The sensor may include an ambient temperature sensor mounted in the electric vehicle.

The ambient temperature sensor is implemented with a thermistor.

Meanwhile, according to various aspects of the present invention, a route guide method for an electric vehicle, may include detecting an ambient temperature and a battery temperature of the electric vehicle when searching for a traveling route to a destination, predicting battery power based on at least one of the ambient temperature or the battery temperature, and performing a route guide by selecting, the traveling route, a route representing the least total cost of battery consumption energy, based on the battery power.

The detecting of the ambient temperature and the battery temperature may include searching for at least one route to the destination based on map data and obtains road information related to each link included in the route which is found.

The predicting of the battery power may include predicting a battery state in traveling on each link by use of the road information related to the link, the battery temperature, and a state of charge, and predicting available battery power before traveling on the link, based on the battery state.

The predicting of the battery state may include estimating the battery temperature and the state of charge in traveling on the link by predicting an average current and energy consumption in traveling based on the road information related to the link.

The predicting of the battery state may include predicting battery power required in traveling on the link based on the road information related to the link.

The predicting of the available battery power may include estimating the available battery power before traveling on the link, based on the battery temperature and the state of charge, which are estimated, in traveling on the link.

The route guide method may include excluding a non-travelable link based on a difference between the required battery power and the available battery power, after determining a battery power cost of the link.

The route guide method may include determining, as a non-travelable area, a link having the required battery power greater than the available battery power, after determining the battery power cost of the link.

The route guide method may include displaying the non-travelable area on a display screen, after determining the battery power cost of the link.

The road information related to the link may include at least one of an average vehicle speed, a traveling time, a traveling distance, or a gradient of the link.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In describing components of exemplary embodiments of the present invention, the terms $1^{st}$, $2^{nd}$ first, second, A, B, (a), (b), and the like may be used herein. These terms are only used to distinguish one component from another component, but do not limit the corresponding components irrespective of the order or priority of the corresponding components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As the ambient temperature is lowered in the winter, the power of the driving battery is lowered, so it may be difficult for a vehicle to drive a hill road having the great gradient and a curved road having the great curvature. Accordingly, there is suggested a technology of searching for a route while focusing on a travelable road section (link) and of guiding the vehicle, by taking into consideration a battery power characteristic based on the ambient temperature and the battery temperature. In other words, according to an exemplary embodiment of the present invention, the vehicle may be prevented from being guided to a non-travelable area when the road to the destination is searched, by excluding a road section that it is difficult for the electric vehicle to travel under the current battery power of the vehicle.

Figure 1:
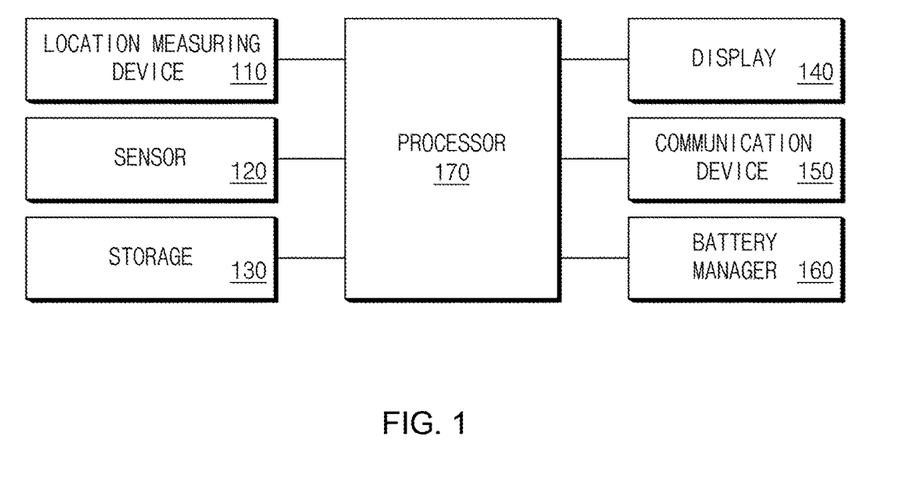
FIG. 1 is a block diagram illustrating a route guide apparatus configured for an electric vehicle, according to an exemplary embodiment of the present invention.
Figure 2:
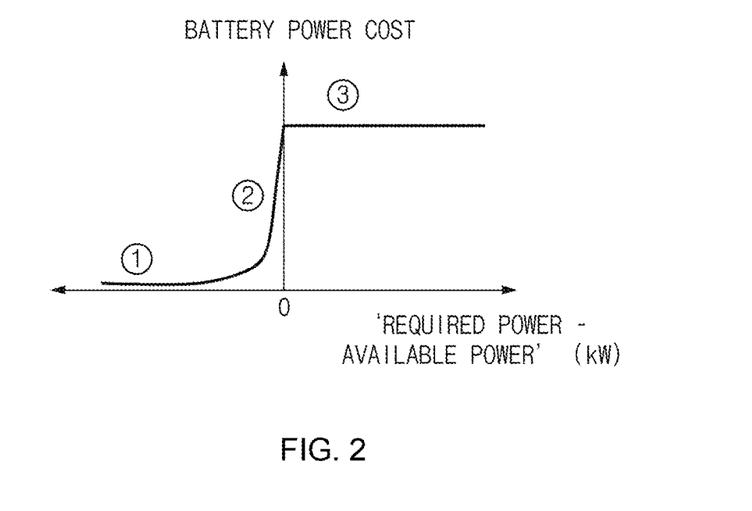
FIG. 2 is a graph illustrating a battery power cost in relation to the present invention.
Figure 3:
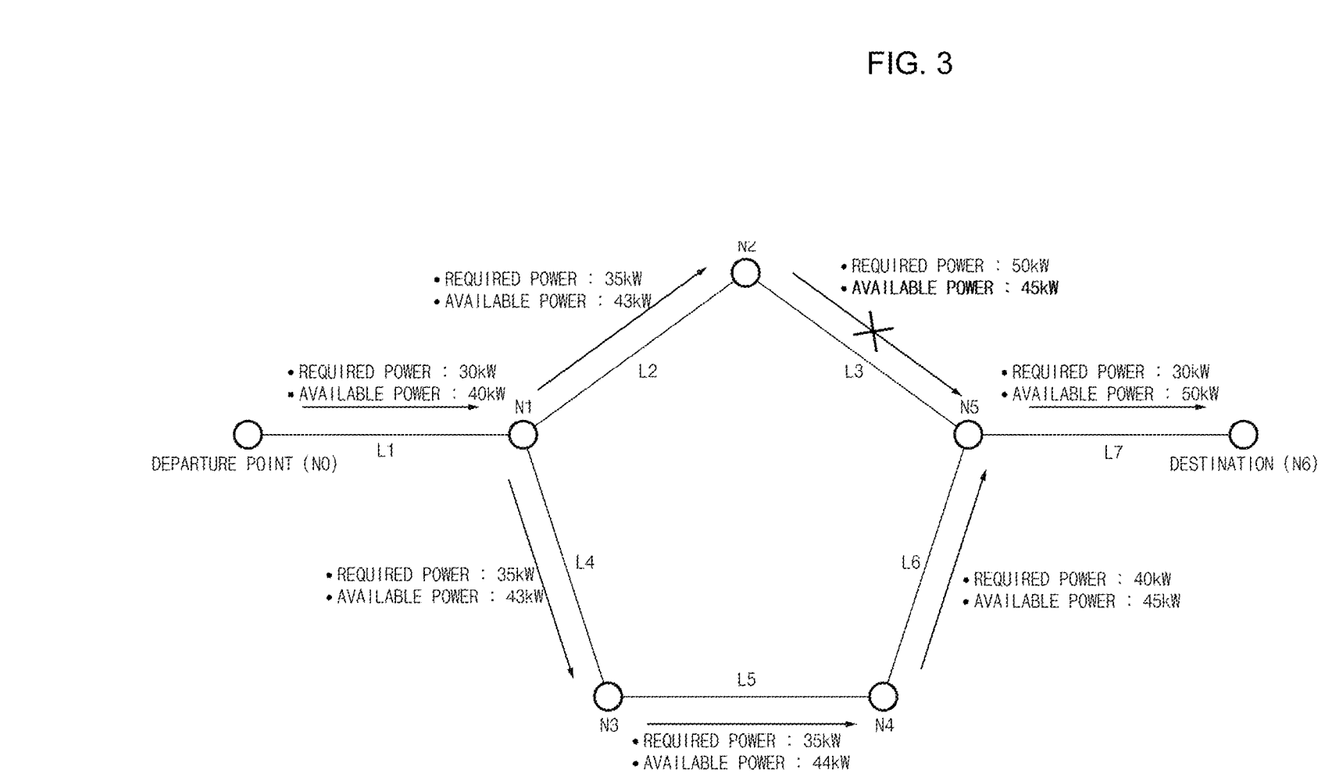
FIG. 3 is a view exemplarily illustrating a manner for determining a travelable state on each link, in relation to the present invention.
Figure 4:
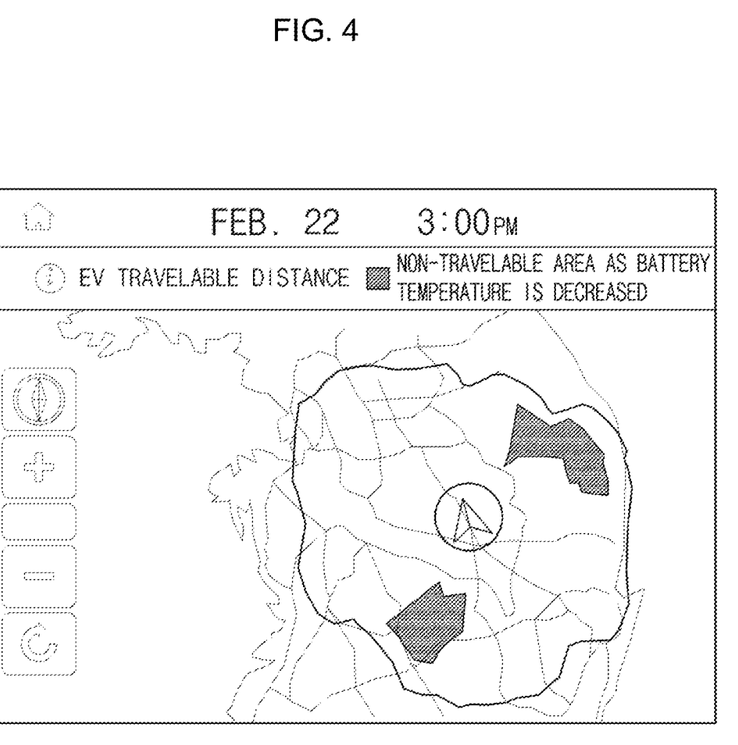
FIG. 4 is a view exemplarily illustrating a screen that a travelable area is displayed, in relation to the present invention.

FIG. 1 is a block diagram illustrating a route guide apparatus configured for an electric vehicle, according to an exemplary embodiment of the present invention, FIG. 2 is a graph illustrating a battery power cost in relation to the present invention, FIG. 3 is a view exemplarily illustrating a manner for determining a travelable state on each link, in relation to the present invention, and FIG. 4 is a view exemplarily illustrating a screen that a travelable area is displayed, in relation to the present invention.

Referring to FIG. 1, a route guide apparatus (hereinafter, referred to as "electric vehicle guide apparatus" for the convenience of explanation) for the electric vehicle includes a location measuring device 110, a sensor 120, a storage 130, a display 140, a communication device 150, a battery manager 160, and a processor 170.

The location measuring device 110 measures a current location of a vehicle. The location measuring device 110 may be implemented with a global positioning system (GPS) receiver. The location measuring device (GPS receiver) 110 determines the current location of the vehicle by use of signals transmitted from at least three GPS satellites. The location measuring device 110 determines the distance between a satellite and the location measuring device 110 by use of the difference between time that the satellite transmits a signal and time that the location measuring device 110 receives the signal. The location measuring device 110 determines the current location of the vehicle by use of the determined distance between the satellite and the location measuring device 110 and the location information related to the satellite, which is contained in the transmitted signal. In the instant case, the location measuring device 110 determines the current location through the triangulation method.

In an exemplary embodiment of the present invention, the sensor 120 includes an ambient temperature sensor mounted in the vehicle to detect (measures) an ambient temperature of a vehicle through the ambient temperature sensor mounted in the vehicle. The ambient temperature sensor may be implemented with a thermistor. Although the exemplary embodiment has been described in that the ambient temperature is measured using one ambient temperature sensor, the present invention is not limited thereto. The sensor 120 may include at least two ambient temperature sensors mounted in the vehicle and determine an average ambient temperature measured by the at least two ambient temperature sensors mounted in the vehicle and may transmit the average ambient temperature to the processor 170.

The storage 130 stores software programmed such that the processor 170 performs a preset operation. The storage 130 includes map data, a route searching algorithm, and setting information.

Furthermore, in an exemplary embodiment of the present invention, the storage 130 stores a lookup table including battery power in kilowatts based on a battery temperature and a State of charge (SOC) value of a battery (see table 1).

TABLE 1

| Temperature (° C.) | SOC (%) | | | | | | | |
| --- | --- | --- | --- | --- | --- | --- | --- | --- |
| | 0 | 5 | 10 | 15 | 20 | 30 | 40 | ... |
| −20 | 0 | 27 | 49 | 85 | 122 | 154 | 185 | ... |
| −10 | 7 | 41 | 77 | 129 | 180 | 234 | 287 | ... |
| −5 | 12 | 57 | 108 | 175 | 242 | 320 | 396 | ... |
| 0 | 19 | 78 | 153 | 262 | 373 | 452 | 530 | ... |
| 5 | 25 | 100 | 200 | 353 | 510 | 591 | 669 | ... |
| ... | ... | ... | ... | ... | ... | ... | ... | ... |

The storage 130 may be implemented with at least one of storage media (recording media) such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a detachable disk, and a web storage.

The display 140 outputs the processing state and the processing result based on the operation of the processor 170. The display 140 displays a traveling route and/or a travelable area.

The display 140 may include a sound output module such as a speaker to output audio data. For example, the display 140 may display road guide information while outputting a voice signal (audio signal) through the speaker.

The display 140 may include at least one of a liquid crystal display (LCD), a thin film transistor-liquid crystal display (TFT LCD), an organic light-emitting diode (OLED) display, a flexible display, a three dimensional (3D) display, a transparent display, a head-up display (HUD), a touch screen, and a cluster.

Furthermore, the display 140 may be implemented with a touchscreen coupled to a touch sensor and thus may be used as an input device as well as an output device. The touch sensor may include a touch film or a touch pad.

The communication device 150 makes wireless communication with an external electronic device (e.g., a mobile terminal, a vehicle terminal, and a server). Wireless communication technologies may include wireless Internet technologies, such as Wireless LAN (WLAN; WiFi), wireless broadband (Wibro) and World Interoperability for Microwave Access (Wimax), short-range communication technologies, such as Bluetooth, Near Field Communication (NFC), Radio Frequency Identification (RFID), infrared data association (IrDA), ultra wideband (UWB), and ZigBee, and/or mobile communication technologies such as Code Division Multiple Access (CDMA), Global System for Mobile Communication (GSM), Long Term Evolution (LTE), and LTE-Advanced.

The communication device 150 receives real-time traffic information and map data (map information) from a traffic control center. The real-time traffic information and the map data received through the communication device 150 may be stored in the storage 130.

The battery manager 160 optimally manages the battery mounted in the electric vehicle to increase the energy efficiency and to extend the life span of the battery. In the instant case, the battery refers to a driving battery that provides driving power to the vehicle. The battery manager 160 may be implemented with a battery management system (BMS).

The battery manager 160 monitors battery states, such as the voltage, current, and temperature of the battery, and the SoC (an amount of charge remaining in the battery) in real time. Furthermore, the battery manager 160 protects the battery by preventing overcharge or over discharge of the battery in advance.

In an exemplary embodiment of the present invention, the battery manager 160 is connected to sensors detecting the voltage, current, and temperature of the battery to provide the battery states.

The battery manager 160 makes data communication with the processor 170 through an In-Vehicle network (IVN). The battery manager 160 transmits battery information, such as an SOC and a battery temperature, to the processor 170 through the IVN. In the instant case, the IVN is implemented with a Controller Area Network (CAN), a Media Oriented Systems Transport (MOST) network, a Local Interconnet Network (LIN) and/or an X-by-Wire (Flexray).

The processor 170 controls the overall operation of the electric vehicle guide apparatus. The processor 170 may include at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and microprocessors.

The processor 170 sets a destination according to a user input. In the instant case, the processor 170 may set the current location of the vehicle, which is measured through the location measuring device 110, as a starting point or may set a place (location), which is input by the user, as the starting point.

The processor 170 searches for at least one route between the starting point and the destination by use of the map data. In other words, the processor 170 searches for at least one route to arrive at the destination by utilizing the map data. The processor 170 may consider real-time traffic information at a time when the route is search.

The processor 170 may search for the shortest route, the fastest route, and/or the ECO route (the route representing the optimal energy consumption) to the destination. According to an exemplary embodiment of the present invention, a manner of searching for the ECO route will be described below.

Hereinafter, description will be made regarding the procedure of searching for the ECO route which is the optimal energy consumption route.

The processor 170 obtains link information related to each route searched based on real-time traffic information and map data. The link information includes road information, identification information, and location coordinates of a starting node and a destination node of each road section, that is, each link included in the searched route. In the instant case, the road information includes an average vehicle speed, a driving time, a traveling distance, a gradient, and a curvature of a road.

The processor 170 detects (obtains) the vehicle information through the sensor 120 and the battery manager 160. The vehicle information includes the current ambient temperature and the current battery temperature of the vehicle. The processor 170 detects an ambient temperature of the vehicle through the sensor 120, and detects a battery temperature through the battery manager 160. The processor 170 may obtain SoC information from the battery manager 160.

The processor 170 predicts battery states (a battery temperature and SoC) based on the link information and the vehicle information in traveling on each link. The processor 170 estimates the battery temperature by predicting an average current in traveling. Furthermore, the processor 170 estimates the SoC by predicting consumption energy in traveling.

The processor 170 predicts (estimates) available battery power before driving on each link based on the battery temperature and the SoC estimated for each link. The processor 170 predicts the available battery power before driving on a specific road section such as a soaring hill road having the gradient equal to or greater than a threshold value and a curved road having the curvature equal to or greater than a threshold value. The processor 170 predicts the available battery power (available power) by referring to the lookup table stored in the storage 130. For example, when the battery temperature and the SoC are predicted to −5° C. and 15% in the driving of a specific link, the processor 170 may predict (estimate), based on the lookup table illustrated in Table 1, the battery power to 175 kW before the driving on the relevant link.

The processor 170 predicts a battery current rate in link driving, based on link information and vehicle information. In other words, the processor 170 determines required power which is necessary for driving a relevant link based on vehicle information such as link information including an average vehicle speed, a driving time, and a gradient on a specific link, and a current ambient temperature of the vehicle and a current battery temperature of the vehicle.

The processor 170 determines a battery power cost of each link by use of a cost function. The battery power cost is determined based on power (required power) necessary for link driving and available battery power (available power) before entering the link as illustrated in FIG. 2. The processor 170 determines, based on the battery power cost, whether the link driving is possible.

In more detail, when the 'required power-available power' is equal to or less than '0', the processor 170 determines the battery power cost to '0' since there is present a sufficient available power (see ① of FIG. 2). The processor 170 determines the link driving as being possible when the battery power cost is '0'.

Next, when the 'required power—available power' approximates '0', the processor 170 determines that the driving is possible on a relevant link, since the margin of the available battery power is insufficient but driving is possible on the relevant link, (see ② of FIG. 2). For instance, the processor 170 may determine that the driving is possible on the relevant link although the margin of the available battery power is insufficient if the difference between the required power and the available power is lower than a predetermined value.

However, the processor 170 may guide a vehicle such that the vehicle avoids the relevant link by increasing the battery power cost when the margin of the available battery power is insufficient. For instance, the processor 170 may guide a vehicle such that the vehicle avoids the relevant link by increasing the battery power cost when the difference of the required power and the available power is greater than a predetermined value.

Finally, when the 'required power—available power' is greater than '0', the processor 170 determines that driving is insufficient on the relevant link, since the battery power is insufficient (see ③ of FIG. 2). In the instant case, the processor 170 allows the vehicle to avoid the relevant link by setting the battery power cost to a significantly higher value.

For example, as illustrated in FIG. 3, when a first route "N0→N1→N2→N5→N6" and a second route of "N0→N1→N3→N4→N5→N6") from a starting point "N0" to a destination "N6", the processor 170 determines required power and available power with respect to links L1 to L7 included in the first route and the second route. The processor 170 detects a non-travelable link based on the determined required power and the determined available power. In other words, the processor 170 guides the vehicle such that the vehicle avoids a specific link when 'required power-available power' is not '0' of the specific link. The processor 170 determines link L3 as a non-travelable area when the required power is greater than the available power like the link L3.

The processor 170 determines the total cost of battery consumption energy of each searched route based on the battery power cost of each link. The total cost may be expressed as in Equation 1.

$$\text{Total cost} = \text{driving cost} + \text{stop cost} + \text{turning cost} + \ldots + \text{time cost} + \text{battery power cost} \qquad \text{Equation 1}$$

Referring to Equation 1, the processor 170 determines the total cost by adding up a battery energy cost necessary for driving including a driving energy cost (driving cost), a stop energy cost (stop cost), and a turning energy cost (turning cost), a time cost, and a battery power cost. The time cost is an item used to restrict driving time such that the driving time is not excessive, and the battery power cost is used to allow the vehicle to avoid a link that traveling is impossible under current battery power.

The processor 170 selects, as the traveling route, a route, which represents the least cost, among the searched routes and guides a current traveling link and a next traveling link based on the selected traveling route.

Meanwhile, the processor 170 may display a radiation travelable area on a map, which is displayed on the display 140, in overlap with the map based on the SoC, when the destination is not set. The processor 170 determines energy (required power) necessary for traveling of each link and a battery power cost of each link, based on the current location of the vehicle. The processor 170 determines, as the travelable area, a link satisfying 'SoC−Σ(energy required for traveling on each link) >0'. Furthermore, the processor 170 determines, as the non-travelable area, a link satisfying 'battery power cost of each link >0' The processor 170 displays the travelable area and the non-travelable area while distinguishing between the travelable area and the non-travelable area as illustrated in FIG. 4.

Figure 5:
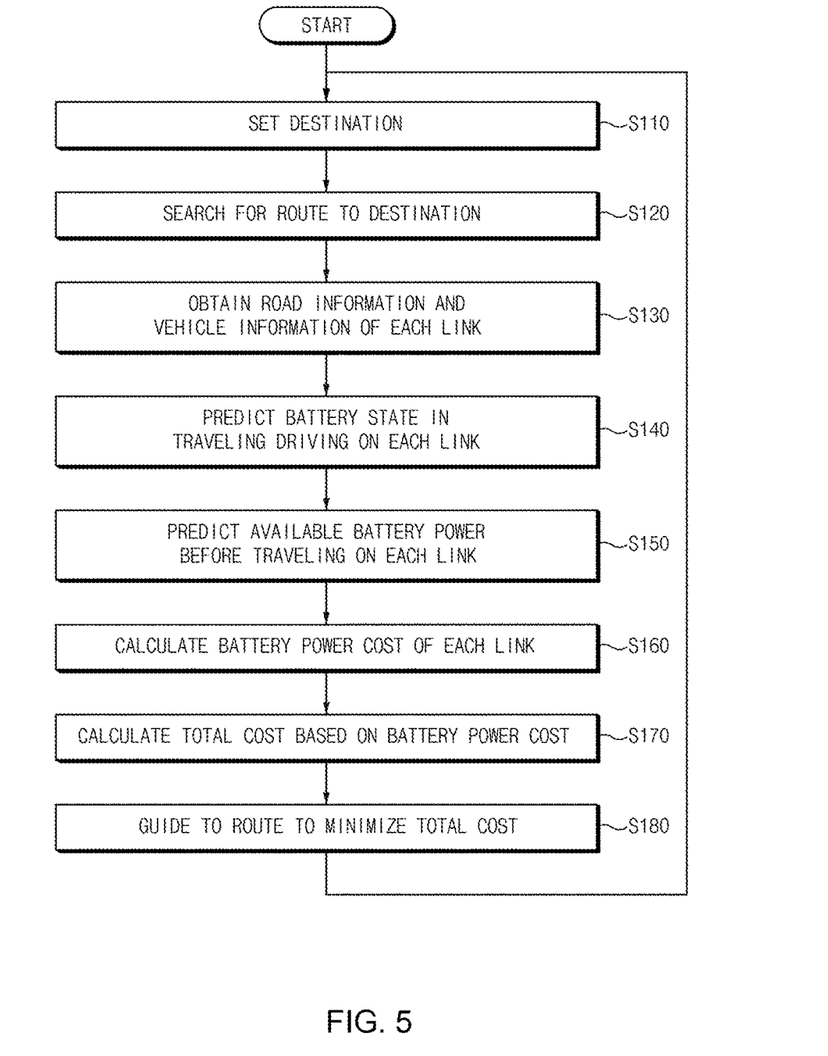
FIG. 5 is a flowchart illustrating a route guide method for the electric vehicle, according to an exemplary embodiment of the present invention.

FIG. 5 is a flowchart illustrating a route guide method for an electric vehicle, according an exemplary embodiment of the present invention.

Referring to FIG. 5, the processor 170 sets a destination depending on a user input (S110). The processor 170 sets, as a starting point, the current location of the vehicle measured by the location measuring device 110 or the location input by a user.

The processor 170 searches for at least one route to the destination based on the map data (S120).

The processor 170 acquires link information and vehicle information on the searched route (S130). The link information includes road information, identification information, and location coordinates of the starting node (starting point) and the destination node (destination) of each road section, that is, each link included in the searched route. In the instant case, the road information includes an average vehicle speed, a traveling time, a traveling distance, a gradient, and a curvature of a road. The vehicle information includes the ambient temperature, the battery temperature, and the SOC value of the vehicle.

The processor 170 predicts a battery state in link driving, based on link information and vehicle information (S140). The processor 170 estimates the battery temperature by predicting an average current in link traveling. Furthermore, the processor 170 estimates the SOC by predicting consumption energy. The processor 170 determines a battery current rate, that is, power (required power) necessary for link traveling in link traveling using road information related to each link.

The processor 170 predicts available battery power (available power) before traveling on each link, based on the battery temperature and the battery SoC predicted for each link (S150). The processor 170 predicts the available battery power of each link by referring to the lookup table stored in the storage 130 and having the battery power defined based on the battery temperature and the battery SoC.

The processor 170 determines the battery power cost of each link based on the required power and the available power (S160). The processor 170 determines whether to avoid the relevant link based on the battery power cost of each link. The processor 170 guides the vehicle such that the vehicle avoids a link representing a battery power cost having no '0'. In other words, the processor 170 excludes a route including the link representing a battery power cost having no '0' from the searched routes.

The processor 170 determines the total cost of the battery consumption energy of each searched routed based on the battery power cost of each link (S170). In the instant case, the processor 170 may determine the total cost of the battery consumption energy with respect to remaining routes of the searched routes other than the route including the link representing a battery power cost having no '0'.

The processor 170 performs a route guide by establishing, as a traveling route, a route to minimize the total cost of battery consumption energy, among the searched routes (S180).

Figure 6:
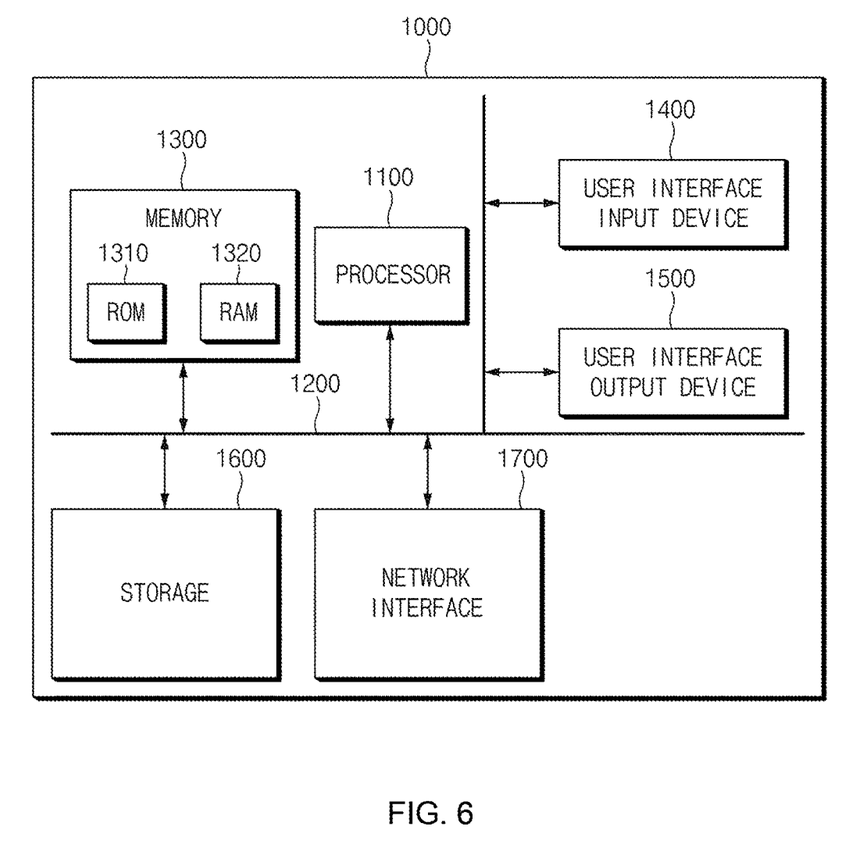
FIG. 6 is a block diagram illustrating a computing system that the route guide method for the electric vehicle is executed, according to an exemplary embodiment of the present invention.

FIG. 6 illustrates a computing system to execute a route guide method for the electric vehicle, according to an exemplary embodiment of the present invention.

Referring to FIG. 6, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, according to an exemplary embodiment of the present invention, the route to the destination, which represents the optimal energy consumption under the optimal battery power, may be searched based on the battery power characteristic made as the battery temperature of the electric vehicle is lowered, and may be provided for the user while excluding the non-travelable road section (link).

Furthermore, according to an exemplary embodiment of the present invention, the user may recognize the non-travelable road (link) in advance by displaying the non-travelable road section (link) resulting from the lack of the battery power as the vehicle ambient temperature and the battery temperature is lowered.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A route guide apparatus for an electric vehicle, the route guide apparatus comprising:
   a sensor detecting an ambient temperature of the electric vehicle;
   a battery manager monitoring a battery temperature; and a processor configured for performing a route guide by predicting battery power on a basis of at least one of a detected ambient temperature or a monitored battery temperature when searching for a traveling route among at least one route to a destination of the electric vehicle, and by selecting, as the traveling route, a route which represents a least total cost of battery consumption energy among the at least one route based on a predicted battery power among the at least one route, wherein the processor is configured for:

predicting an available battery power before traveling on each link included in the at least one route based on the monitored battery temperature and a state of charge (SOC) obtained through the battery manager;

predicting a required battery power necessary in traveling on each link based on road information related to each link;

determining whether traveling of the electric vehicle is possible on each link based on the required battery power and the available battery power; and     excluding a link where the processor concludes that traveling of the electric vehicle is not possible.

2. The route guide apparatus of claim 1, wherein the processor searches for the at least one route to the destination based on map data, and obtains the road information related to each link included in the at least one route which is found by the processor.

3. The route guide apparatus of claim 2, wherein the road information related to each link includes at least one of an average vehicle speed, a traveling time of the electric vehicle, a traveling distance of the electric vehicle, a gradient of each link, or a curvature of each link.

4. The route guide apparatus of claim 2, wherein the processor determines a battery power cost of each link based on the required battery power and the available battery power.

5. The route guide apparatus of claim 4, wherein the processor determines when traveling of the electric vehicle is possible on each link, based on the battery power cost of each link.

6. The route guide apparatus of claim 4, wherein the processor determines a total cost of the battery consumption energy, based on the battery power cost of each link.

7. The route guide apparatus of claim 1, wherein the sensor includes:

an ambient temperature sensor mounted in the electric vehicle.

8. A route guide method for an electric vehicle, the route guide method comprising:

detecting an ambient temperature and a battery temperature of the electric vehicle when searching, by a processor, for a traveling route to a destination of the electric vehicle among at least one route;

predicting, by the processor, battery power on a basis of at least one of a detected ambient temperature or a detected battery temperature; and     performing, by the processor, a route guide by selecting, as the traveling route, a route representing a least total cost of battery consumption energy among the at least one route on a basis of a predicted battery power, wherein the predicting of the battery power includes:

predicting an available battery power before traveling on each link included in the at least one route based on a monitored battery temperature and a state of charge (SOC) obtained through a battery manager, and     predicting a required battery power necessary in traveling on each link based on road information related to each link; and wherein the performing of the route guide includes:

determining whether traveling of the electric vehicle is possible on each link based on the required battery power and the available battery power, and     excluding a link where the processor concludes that traveling of the electric vehicle is not possible.

9. The route guide method of claim 8, further including:

after the detecting of the ambient temperature and the battery temperature, searching, by the processor, for the at least one route to the destination based on map data and obtaining the road information related to each link included in the at least one route which is found by the processor.

10. The route guide method of claim 9, wherein the predicting of the battery power further includes:

determining the available battery temperature and the SOC in traveling of the electric vehicle on each link by predicting an average current and energy consumption in traveling based on the road information related to each link.

11. The route guide method of claim 10, wherein the predicting of the available battery power includes:

estimating the available battery power before traveling of the electric vehicle on each link, based on the determined battery temperature and the determined SOC, which are determined, in traveling of the electric vehicle on each link.

12. The route guide method of claim 11, wherein, after predicting of the available battery power,     excluding a non-travelable link among the at least one route based on a difference between the required battery power and the available battery power.

13. The route guide method of claim 12, wherein, after predicting of the available battery power,     determining, as a non-travelable area, a link having the required battery power greater than the available battery power among links included in the at least one route.

14. The route guide method of claim 12, wherein, after predicting of the available battery power,     displaying, by the processor, the non-travelable link on a display screen.

15. The route guide method of claim 11, wherein, after predicting of the available battery power,     determining when a difference between the required battery power and the available battery power in each link is not equal to zero, and     determining, as a travelable area, a link in which the difference between the required battery power and the available battery power is lower than a predetermined value, among links included in the at least one route, when the difference between the required battery power and the available battery power in each link is determined to be not equal to zero.

16. The route guide method of claim 9, wherein the road information related to each link includes:

at least one of an average vehicle speed, a traveling time of the electric vehicle, a traveling distance of the electric vehicle, a gradient of each link, or a curvature of each link.

* * * * *